US012024386B2

(12) United States Patent
Ramis Llinares et al.

(10) Patent No.: US 12,024,386 B2
(45) Date of Patent: Jul. 2, 2024

(54) OUTPUT TRAY

(71) Applicant: Hewlett-Packard Development Company, L.P., Spring, TX (US)

(72) Inventors: Marta Ramis Llinares, Sant Cugat del Valles (ES); Alberto Arredondo Rosales, Sant Cugat del Valles (ES); Felix Ruiz Martinez, Sant Cugat del Valles (ES); Ferran Esquius Rafat, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/768,447

(22) PCT Filed: Nov. 8, 2019

(86) PCT No.: PCT/US2019/060413

§ 371 (c)(1),
(2) Date: Apr. 12, 2022

(87) PCT Pub. No.: WO2021/091568

PCT Pub. Date: May 14, 2021

(65) Prior Publication Data

US 2024/0010454 A1 Jan. 11, 2024

(51) Int. Cl.

*B65H 31/02* (2006.01)
*B41J 11/00* (2006.01)
*B41J 29/06* (2006.01)

(52) U.S. Cl.

CPC .......... *B65H 31/02* (2013.01); *B41J 11/0045* (2013.01); *B41J 29/06* (2013.01); *B65H 2405/21* (2013.01); *B65H 2405/22* (2013.01)

(58) Field of Classification Search

CPC .......... B41J 13/10; B41J 13/106; B41J 29/06; B65H 29/26; B65H 31/02; B65H 2405/21; B65H 2405/22; B65H 2405/324

See application file for complete search history.

(56) References Cited

U.S. PATENT DOCUMENTS 3,807,726 A * 4/1974 Hope .................. G03D 13/003 271/209
5,123,894 A 6/1992 Bergeman et al.

(Continued)

FOREIGN PATENT DOCUMENTS

CN 101279547 A 10/2008
EP 2759505 A1 7/2014

(Continued)

OTHER PUBLICATIONS

International Search Report and Written Opinion dated Apr. 9, 2020, issued in PCT/US2019/060413, filed Nov. 8, 2019 (5 pages).

*Primary Examiner* — Leslie A Nicholson, III
(74) *Attorney, Agent, or Firm* — Jordan IP Law, LLC

(57) ABSTRACT

An output tray for a printer, a printer comprising the output tray, and a kit of parts including the output tray. The output tray comprises a spool, a guide member, and a sheet attached between to the spool and the guide member. The guide member is movable between a stowed and one or more deployed positions. The sheet is deployed from a stored configuration to one or more in-use positions upon movement of the guide member.

7 Claims, 6 Drawing Sheets

(56) References Cited

U.S. PATENT DOCUMENTS

| | | | | |
|---|---|---|---|---|
| 5,358,345 | A | 10/1994 | Damitio | |
| 5,913,628 | A * | 6/1999 | Sides | B65H 31/22 400/625 |
| 6,568,865 | B1 * | 5/2003 | Fujioka | B65H 31/02 400/625 |
| 8,622,385 | B2 * | 1/2014 | Ueyama | B65H 31/20 271/207 |
| 9,327,529 | B2 * | 5/2016 | Kato | B41J 13/106 |
| 10,023,418 | B2 * | 7/2018 | Asai | B65H 31/20 |
| 11,254,148 | B2 * | 2/2022 | Hamada | B41J 15/04 |
| 11,565,540 | B2 * | 1/2023 | Yato | B41J 13/0009 |
| 11,591,176 | B2 * | 2/2023 | de la Hoz Matveeva | B65H 31/20 |
| 2008/0211170 | A1 | 9/2008 | Motamed | |
| 2011/0291351 | A1 | 12/2011 | Takabatake et al. | |
| 2017/0088384 | A1 | 3/2017 | Asai et al. | |

FOREIGN PATENT DOCUMENTS

| | | | |
|---|---|---|---|
| JP | 2001-247246 | A | 9/2001 |
| JP | 2002-234658 | A | 8/2002 |
| WO | WO-2001009025 | | 2/2001 |
| WO | 2019/190479 | A1 | 10/2019 |

* cited by examiner

OUTPUT TRAY

CLAIM FOR PRIORITY

The present application is a national stage filing under 35 U.S.C 371 of PCT application number PCT/US2019/060413, having an international filing date of Nov. 8, 2019, the disclosure of which is hereby incorporated by reference in its entirety.

BACKGROUND

General purpose printers are transforming home and small business scale printing processes, including removing many current limitations, giving the ability to print on a wider range of print media without the need of specialist machines.

The range of print media available to a user for printing on by a general purpose printer can be influenced positively or negatively by the output tray of the general purpose printer.

BRIEF DESCRIPTION OF THE DRAWINGS

Example implementations will now be described, by way of example, with reference to the accompanying drawings in which.

DETAILED DESCRIPTION

Figure 1:
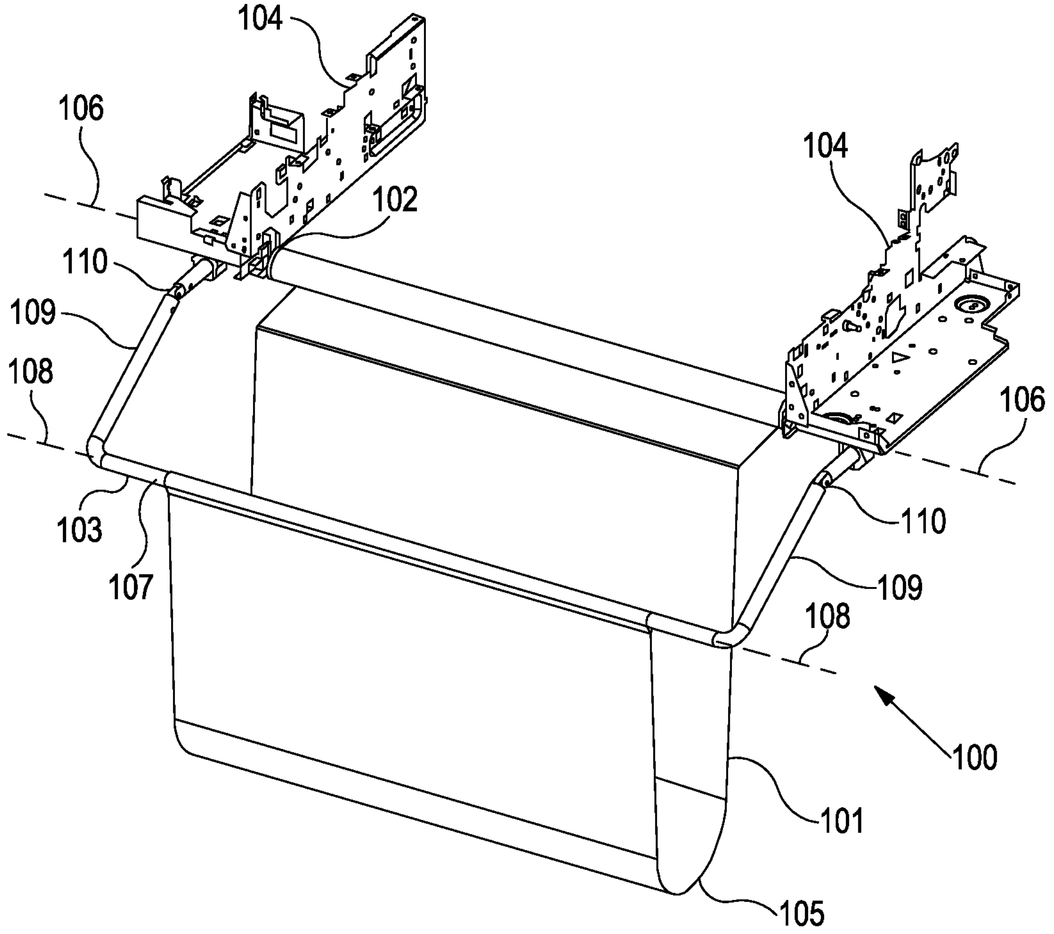
FIG. 1 is a schematic view of an output tray according to example implementations.

FIG. 1 shows an example implementation of the present disclosure including an output tray 100 having a sheet 101 arranged between a spool 102 and a guide member 103. The output tray 100 is shown in an example deployed position with the guide member 103 extended and spaced apart from the spool 102 and one or more lateral wall 104 of a printer (not shown) to which the output tray 100 is fitted.

The sheet 101 in the example deployed position of FIG. 1 is substantially slack between the spool 102 and the guide member 103. Substantially slack means there is an excess of sheet 101 between the spool 102 and guide member 103 such that the length of sheet 101 between the spool 102 and guide member 103 is greater than the distance between the spool 102 and guide member 103. The sheet 101 in this example deployed position sags between the spool 102 and the guide member 103 to form a well 105.

Substantially slack is opposed to substantially taut. Substantially taut means that the sheet 101 is held stretched or pulled tight between the spool 102 and the guide member 103. Where the sheet 101 is held substantially taut the length of sheet 101 between the spool 102 and guide member 103 is approaching, or equal to, the distance between the spool 102 and guide member 103. In some example implementations the sheet 101 may be made of an elastic material. Where an elastic sheet is used, and the elastic sheet is held substantially taut between the spool 102 and the guide member 103, the length of sheet 101 when in a relaxed configuration between the spool 102 and guide member 103 may be less than the distance between the guide member 103 and the spool 102. For the purpose of clarity, the elastic sheet 101 in-use would be in a distended form between the spool 102 and guide member 103, this definition is what would be observed if the distended area of the elastic sheet 101 between the spool 102 and guide member 103 were removed and allowed to contract and return to a relaxed state.

The sheet 101 is constructed of any suitable substantially flexible material. Flexible in this context means capable of being wound around the spool 102 and able to form a well 105 between the guide member 103 and spool 102 when in the substantially slack position. Accordingly, the sheet 101 may be flexible just in one direction along its surface (i.e. the direction travelling from the guide member 103 to the spool 102). The sheet 101 may be substantially rigid in a direction perpendicular to the direction travelling from the guide member 103 to the spool 102. The direction perpendicular to the direction travelling from the guide member 103 to the spool 102 may be that aligned with the rotational axis 106 of the spool 102.

In light of the above, suitable materials for the sheet 101 may include fabrics, woven fabrics, non-woven fabrics, polymer sheets, composite sheet materials, open-weave fabrics, and nets. A net can be considered to be a fabric with an open weave sufficient to form a visible aperture in the case of woven fabrics, alternatively, a net can be considered to have of a series of regular visible apertures in a non-woven fabric. A sheet 101 may also comprise one or more irregular apertures and still fulfil its function.

Other suitable materials for sheets can include a jointed set of elongate slats, a set of track plates, and chains of plastic or metal.

In the example implementation of FIG. 1 the guide member 103 comprises an elongate member 107 arranged with a long axis 108 parallel to a rotational axis 106 of the spool 102. The sheet 101 is attached to this elongate member 107. Suitable attachment means include wrapping the sheet 101 around the member and stitching, heat welding, mechanically coupling, or gluing the sheet 101 to itself to form a loop about the guide member 103. The sheet 101 may be attached either completely or partially to the guide member 103 along the length of the sheet 101. The connection may be a single continuous join or multiple discontinuous joins. Other methods of joining the sheet 101 to the guide member 103 will be apparent to the skilled person including but not limited to, force fit, forming the guide member 103 integrally with the sheet 101, and forming the guide member 103 about the sheet 101.

In example implementations the spool 102 may be located towards a rear of the printer and the guide member 103 spaced apart from the spool 102, wherein the guide member 103 is arranged towards a front of the printer. In this configuration a portion of sheet 101 always remains disposed between the spool 102 and guide member 103 and cannot be coiled on the spool 102 in when in the stowed position.

At least one support member 109 is provided connecting the elongate member 107 to a body of the output tray 100. The support member 109 is arranged perpendicular to the rotational axis 106 of the spool 102. Multiple support members 109 may be provided. The support members 109 may be rigid or flexible (i.e. deformable along a length due to an inherent material property such as elasticity) or provided with joints 110 connecting rigid sections of the support member 109. Using a flexible or jointed support member 109 allows the deployed position of the guide member 103 to be tailored. For example, the implementation in FIG. 1 shows that the guide member 103 is substantially vertically offset relative to the spool 102 due to the joints 110 in the support members 109.

With respect to the connection between the support members 109 and the body (not shown), the support members 109 are moveably attached to the body such that the support members may be displaced in a substantially horizontal direction relative to the body and in a direction perpendicular to an rotational axis 106 of the spool 102. This allows the support member 109 to extend in a direction away from the spool 102 and move from a stowed position to one or more in-use positions.

The one or more in-use positions may be defined by the extent of the displacement of the support member 109 relative to the spool 102.

Suitable attachment means for connecting the support member 109 to the body include runners, friction guides, or if the support member 109 are telescopic, a fixed contact may be sufficient.

The support members 109 may be connected to one another such that movement of one support member 109 by a given amount results in the other support member(s) 109 moving a substantially similar amount synchronously with the movement of the one support member 109.

Movement of the guide member 103 may be manual such as by an end user manually extending by hand the guide member 103 and therefore deploying the output tray 100.

Alternatively, the movement of the guide member 103 may be automated using a deployment mechanism. Suitable deployment mechanisms may include motors, pistons, and cable/pulley systems. Where automated the deployment of the output tray 100 may either be at the command of a user (by either remotely instructing a printer or by providing a direct input to the printer, such as by a button) or deployment may be initiated in response to some other function received by the printer. The user may for example, send a print job to the printer and the printer then automatically deploys the output tray 100 as part of the print process.

Likewise returning the output tray 100 to the stowed position may be manual or automatic and if automatic may be in response to the command from the user (whether remotely or directly input into the printer) or in response to some other function of the printer such as the end of the print job or on detection of an empty print queue.

When in the stowed position the sheet 101 is stored on the spool 102. The sheet 101 is wound on the spool 102 as a coil allowing the sheet 101 to roll off the spool 102 as the output tray 100 is deployed.

The spool 102 may rotate freely on bearings or the like, so that it freely rotates to release the sheet 101 as the guide member 103 is extended (such as in the case of manual deployment of the output tray 100).

A ratchet or clutch system may be used with the spool 102 to prevent unintentional rotation of the spool 102. A stop may also be provided to limit the number of rotations the spool 102 to limit the extension of the sheet 101.

In a first position, corresponding to a first in-use position, the stop can allow sufficient (i.e. the minimum) sheet 101 off the spool 102 so that the sheet 101 is held substantially taut between the guide member 103 and the spool 102. Alternatively, in a second position, corresponding to a second in-use position, the stop may allow an excess of sheet 101 to roll off the spool 102 so that the sheet 101 is substantially slack between the guide member 103 and the spool 102, thereby forming a well 105.

The stop may be arranged to interface with the support member 109 such that the amount of sheet 101 allowed to roll off the spool 102 can be varied depending on the extension of the support member 109.

In a further alternative example implementation, where the extension of the output tray 100 is automated, the rotation of the spool 102 may also be automated.

The rotation of the spool 102 in this instance may be made to correspond with the extension of the guide member 103 such that sufficient sheet 101 is allowed to roll off the spool 102 such that the sheet 101 is held substantially taut between the guide member 103 and the spool 102 in a first in-use position.

Alternatively, the rotation of the spool 102 may be made to be independent of the extension of the guide member 103 such that an excess of sheet 101 is allowed to roll off the spool 102 so that the sheet 101 is substantially slack between the guide member 103 and the spool 102 in a second in-use position, thereby forming a well 105.

The control of the rate of rotation of the spool 102 may be such that the rate transitions from corresponding with the extension of the guide member 103, up to the point the guide member 103 passes the first in-use position whereon the rate of spool 102 rotation then becomes independent of the extension of the guide member 103.

Printing media include, but are not limited to, paper, natural and man-made fabrics and/or textiles, and card. The printing media may be porous or non-porous. Porous printing media may allow a proportion of printing liquid (such as an ink) applied to the porous printing media to pass through and be deposited on any surface below the porous printing media. As the output tray 100 of example implementations is deployable in one or more in-use positions print media of different sizes may be readily accommodated. This includes small form paper sizes such as but not limited to ISO 216 standard sizes A6, A5, A4 and US half letter, letter, and legal sizes. Much larger form print media rolls can also be accommodated by the output tray 100, such as but not limited A1 print paper rolls.

Figure 2:
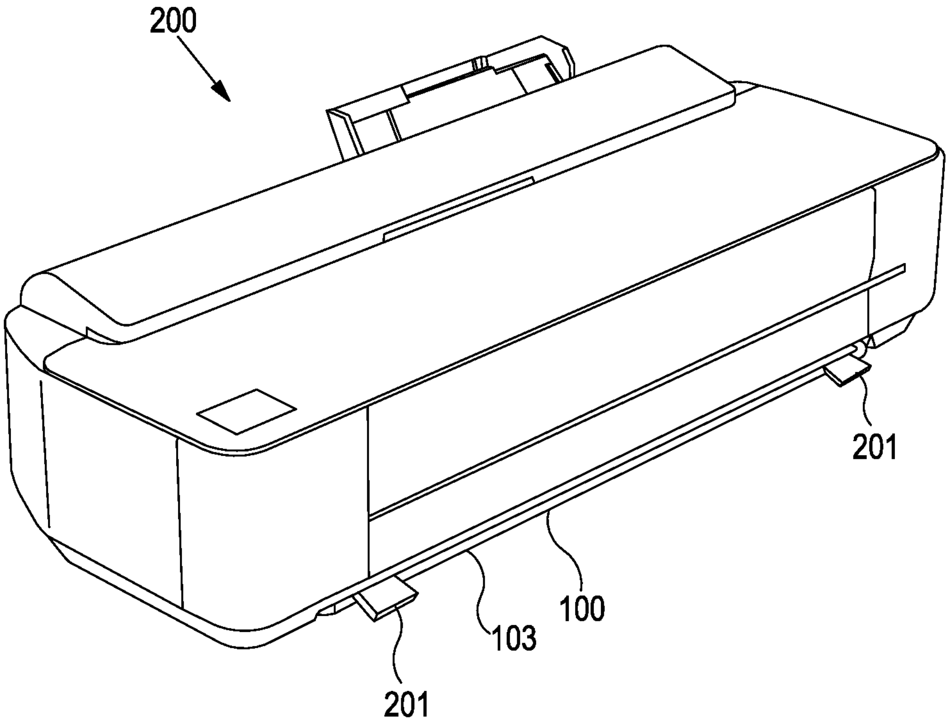
FIG. 2 depicts a general purpose printer h an output tray in a stowed position according to example implementations.

With reference to FIG. 2, there is shown a printer 200 equipped with an output tray 100. The sheet 101 is not visible to an end user when the output tray 100 is in the stowed position. The guide member 103 may be visible when in the stowed position or located out of sight to an end user. An end user approaching such a printer may observe a pull tab 201 or deployment handle alone as evidence of the presence of the output tray 100 in the case of a manually deployable output tray 100.

Where deployment of the output tray 100 is automated there may be no visible element of the output tray 100 apparent to an end user when the output tray 100 is in the stowed position. In this example implementation the output tray 100 is integral to the printer and located within the printer body.

Figure 3:
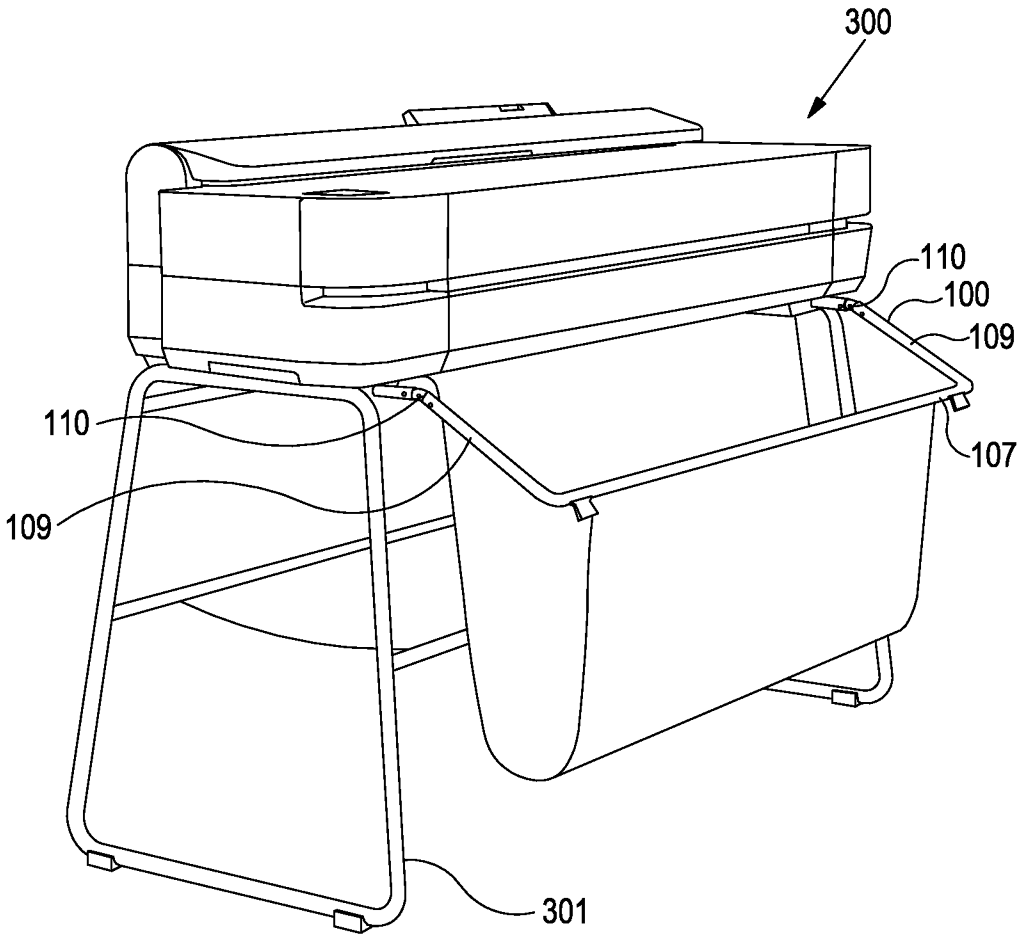
FIG. 3 depicts a general purpose printer on a stand with an output tray in an alternative deployed position according to example implementations.

With reference to FIG. 3, a printer 300 in a further example implementation is arranged upon a stand 301. The stand 301 is independent to the printer 300 and independent to the output tray 100. The output tray 100 may be included within the sub-frame of the printer 300 or may be independent it its own right relative to the printer 300 and to the stand 301, FIG. 3 shows the deployed output tray 100 with a net sheet 101 arranged in a substantially slack position (such as when in a second in-use position). The joints 110 in the support member 109 vertically displace the elongate member 107 of the guide member 103 relative to the position of the elongate member 107 when stowed in the stowed position. This displacement allows easier access to the output tray 100 by an end user. The substantially slack sheet 101 in this configuration is capable of receiving a continuous flow of print media, such as that from a roll of print media.

Figure 4:
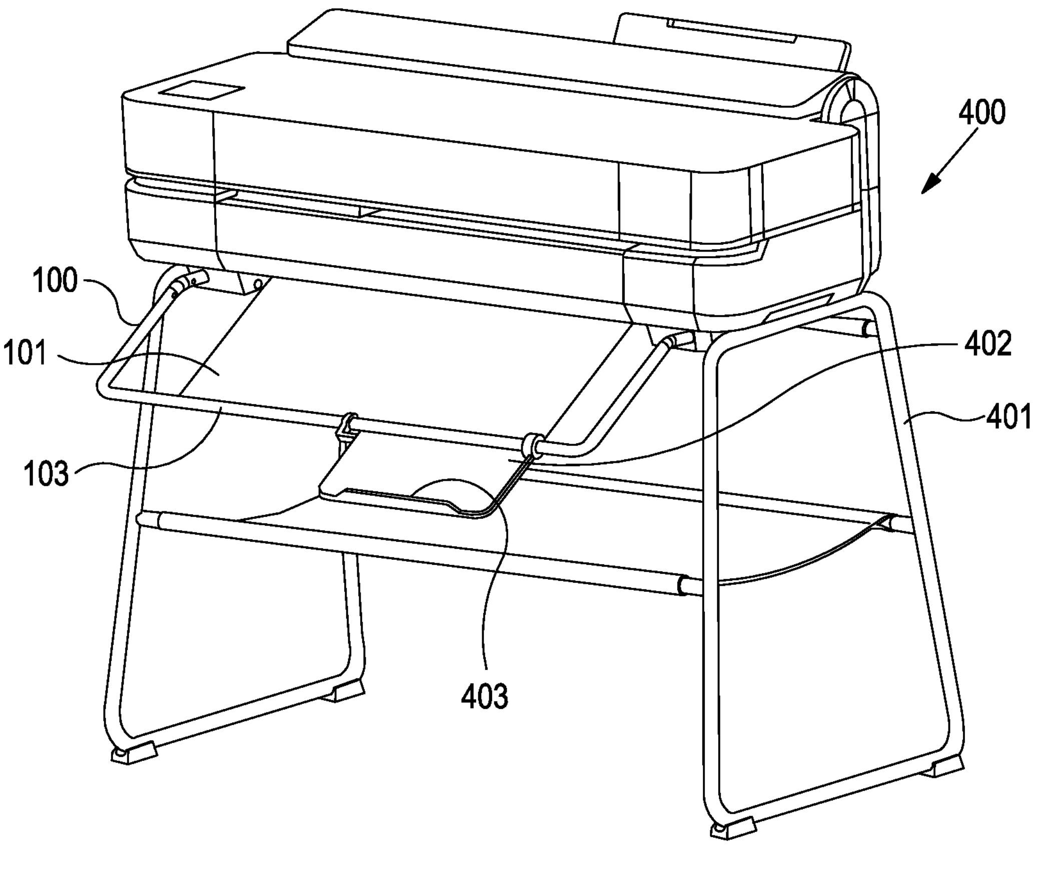
FIG. 4 depicts a general purpose printer on a stand with an output tray in a deployed position according to example implementations.

With reference to FIG. 4 a printer 400 in a further example implementation is arranged on a stand 401 as per the example implementation of FIG. 3. Here an output tray 100 with a continuous sheet (i.e. sheet without apertures) is deployed in a first in-use position with the sheet 101 held substantially taut between the spool 102 and the guide member 103. In this first in-use position the output tray 100 is capable of receiving discrete sheets of print media (such as pages of paper) without the need for any additional accessories or parts to support the discrete sheets of print media. Here support means both of being capable of supporting the weight of a plurality of discrete sheets and/or support of the surface of one or more discrete sheets such that the discrete sheets are laid substantially flat on the output tray. In an alternative embodiment an additional accessory 402 may be provided in order to ensure proper stacking of print media on the output tray when in the first in-use position. The additional accessory may be releasably attachable to the guide member 103 and provide an abutment 403 against which print medial may rest. The abutment 403 prevents the print media from falling off the output tray when in the first in-use position.

Figure 5:
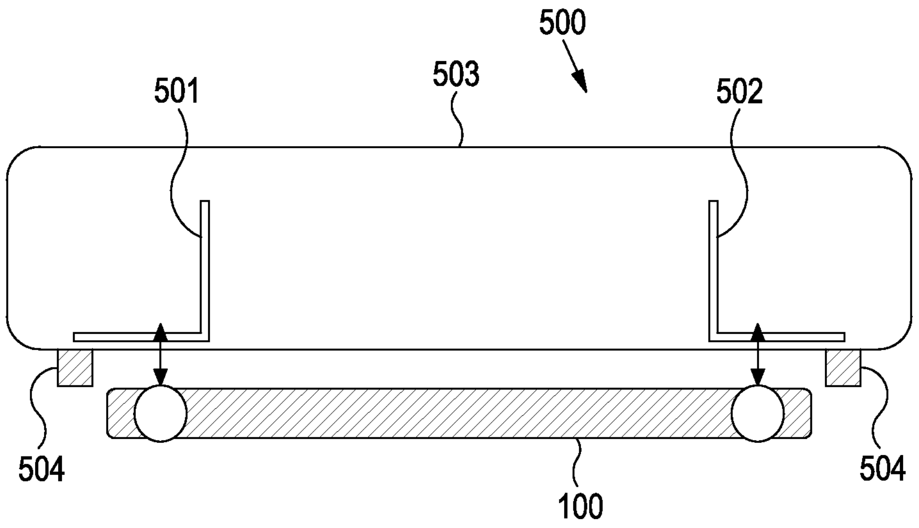
FIG. 5 depicts a general purpose printer with an integrated output tray according to example implementations.

With reference to FIG. 5 there is shown a cross section of an example implementation. The printer 500 comprises a substructure having first 501 and second 502 lateral walls arranged within the printer body 503. Feet 504 are provided on an underside of the printer 500 and space the printer 500 away from a surface upon which the printer 500 is situated.

In instances where the output tray 100 is provided with the printer or as an after-market kit, the output tray 100 may be sized and arranged to locate between the feet 504 of the printer 500 outside the printer body 503. The output tray 100 can be fixed using suitable fixings (such as screws or bolts) thought the body 503 of the printer 500 to the lateral walls 501, 502.

Attachment of the output tray 100 to the printer 500 can either be made during the manufacturing process of the printer 500 or by an end user on receipt and initial set up of the printer 500.

Figure 6:
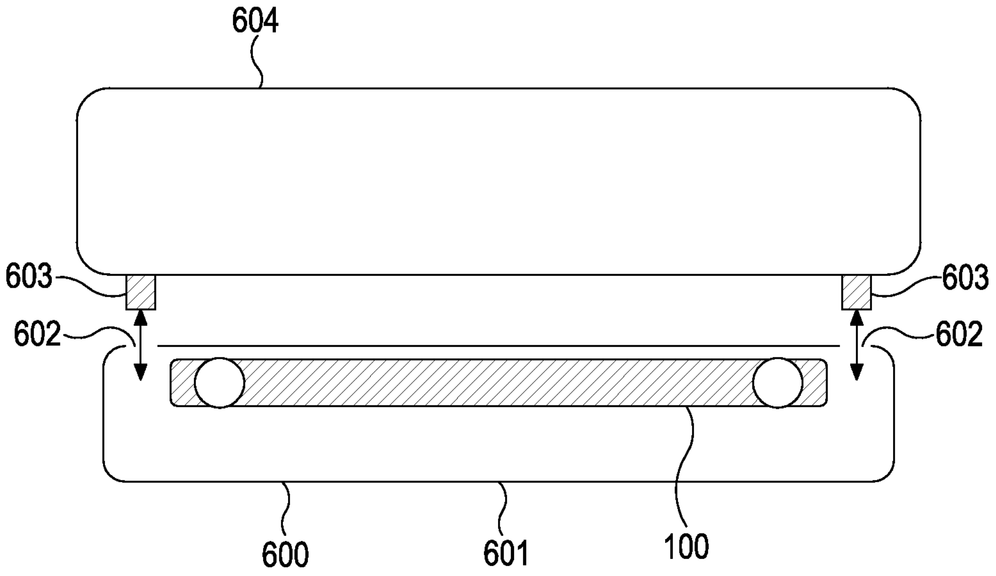
FIG. 6 depicts a general purpose printer with an output tray provided as a kit according to example implementations.

FIG. 6 shows an alternative example implementation where the output tray 100 is provided as a printer base 600. Here the output tray 100 is provided with a housing 601 in which the spool 102 and support member 109 are located. Locating means (such as notches 602 or depressions in the printer base housing 601) may be provided in the printer base 600 housing to locate and hold the feet 603 of a printer 604. The printer 604, in this way, is able to be located and supported upon the printer base 600. No additional fixings are used nor any mechanical connection to the printer, although such fixings/connections may be provided. In this way the output tray 100 can be provided as a stand-alone accessory to the printer 604.

Further example implementations can be realized according to the following feature sets:

Feature Set 1. An output tray for a printer, the output tray comprising a spool, a guide member, and a sheet attached between to the spool and the guide member, wherein the guide member is movable between a stowed and one or more deployed positions, wherein the sheet is deployed from a stored configuration to one or more in-use positions upon movement of the guide member.

Feature Set 2. The output tray as referred to in Feature Set 1 wherein the one or more in-use positions comprises a position where the sheet is substantially slack between the spool and the guide member.

Feature Set 3. The output tray as referred to in Feature Set 1 wherein the one or more in-use positions comprises a position where the sheet is substantially held taut between the spool and the guide member.

Feature Set 4. The output tray as referred to in Feature Set 1 wherein deployment of the sheet is assisted by using a deployment mechanism, the deployment mechanism arranged to interface with at least one support member connected with the guide member, wherein in use the deployment mechanism urges the support member.

Feature Set 5. The output tray as referred to in Feature Set 4 wherein the deployment mechanism deploys the sheet without intervention by a user.

Feature Set 6. The output tray as referred to in Feature Set 4 wherein the sheet is attached to at least one additional support member.

Feature Set 7. The output tray as referred to in Feature Set 6 wherein the deployment mechanism synchronously assists movement of the at least one support member with the movement of the at least one additional support member.

Feature Set 8. A printer comprising the output tray of Feature Set 1.

Feature Set 9. A printer as referred to in Feature Set 8 wherein the spool is located towards a rear of the printer and the guide member is spaced apart from the spool, wherein the guide member is arranged towards a front of the printer.

Feature Set 10, A printer as referred to in Feature Set 8 wherein the spool is attached to at least one lateral wall of the printer.

Feature Set 11. A printer as referred to in Feature Set 8 wherein the guide member is attached to at least one lateral wall of the printer.

Feature Set 12. A printer as referred to in Feature Set 8 wherein the sheet is not visible to a user when in the stored configuration.

Feature Set 13. A kit of parts comprising an output tray as referred to in Feature Set 1, wherein the kit of parts is suitable for retrofitting to a printer.

Feature Set 14. A kit of parts as referred to in Feature Set 13 further comprising a printer stand.

Feature Set 15. An accessory for a printer comprising the output tray referred to in Feature Set 1.

The invention claimed is:

1. An output tray for a printer, the output tray comprising:

a pair of lateral support walls including joints, where the lateral support walls fix the output tray directly to a printer body;

a spool connected to and spanning the lateral support walls;

a guide member including an elongate member parallel to a rotational axis of the spool and a pair support members perpendicular to the rotational axis of the spool, wherein the support members are connected to the elongate member at one end and connected to respective joints of the lateral support walls at an opposite end, wherein the support members enable the guide member to move between a stowed and one or more deployed positions; and a sheet attached between to the spool and the guide member, wherein the spool enables the sheet to be substantially slack or substantially taut at each of the one or more in-use positions.

2. A printer comprising the output tray of claim 1.

3. A printer as claimed in claim 2 wherein the spool is located towards a rear of the printer and the guide member is spaced apart from the spool, wherein the guide member is arranged towards a front of the printer.

4. A printer as claimed in claim 2 wherein the sheet is not visible to a user when in the stored configuration.

5. A kit of parts comprising an output tray as claimed in claim 1, wherein the kit of parts is suitable for retrofitting to a printer.

6. A kit of parts as claimed in claim 5 further comprising a printer stand.

7. An accessory for a printer comprising the output tray claimed in claim 1.

* * * * *